(12) United States Patent
Yang

(10) Patent No.: US 8,331,264 B2
(45) Date of Patent: Dec. 11, 2012

(54) WIRELESS SENSOR NETWORK AND METHOD FOR CONFIGURATION THEREOF

(75) Inventor: Jun Mo Yang, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1007 days.

(21) Appl. No.: 12/344,693

(22) Filed: Dec. 29, 2008

(65) Prior Publication Data

US 2009/0168670 A1    Jul. 2, 2009

(30) Foreign Application Priority Data

Dec. 28, 2007 (KR) ............................ 2007-0140011

(51) Int. Cl.
*H04L 12/28* (2006.01)
*G08C 17/00* (2006.01)
*H04H 20/71* (2008.01)
*H04W 4/00* (2009.01)

(52) U.S. Cl. ......... 370/254; 370/311; 370/312; 370/328
(58) Field of Classification Search .................. None
See application file for complete search history.

(56) References Cited

U.S. PATENT DOCUMENTS

| | | | |
|---|---|---|---|
| 2005/0288888 A1* | 12/2005 | Ye et al. | 702/150 |
| 2006/0140135 A1* | 6/2006 | Bonta et al. | 370/254 |
| 2008/0253327 A1* | 10/2008 | Kohvakka et al. | 370/330 |
| 2009/0059842 A1* | 3/2009 | Maltseff et al. | 370/328 |

OTHER PUBLICATIONS

Doherty et al., "Convex Position Estimation in Wireless Sensor Networks", IEEE, pp. 1655-1663, 2001.*

* cited by examiner

*Primary Examiner* — Faruk Hamza
*Assistant Examiner* — Thinh Tran
(74) *Attorney, Agent, or Firm* — Cha & Rieter, LLC

(57) ABSTRACT

A wireless sensor network and a method for configuration thereof are includes a plurality of sensor nodes and a sink node. The network configuration method includes collecting location information about the sensor nodes by the sink node, setting the sensor nodes, which have sensing regions include a transmitting region of the sink node, to an active node based on the location information, and configuring a network composed of the active nodes. Dead nodes are detected by the sink node, and inactive nodes are activated to reconfigure the network as needed due to the detected dead nodes.

14 Claims, 7 Drawing Sheets

WIRELESS SENSOR NETWORK AND METHOD FOR CONFIGURATION THEREOF

CLAIM OF PRIORITY

This application claims the benefit of priority under 35 U.S.C. §119(a) from a Korean patent application filed in the Korean Intellectual Property Office on Dec. 28, 2007 and assigned Serial No. 10-2007-0140011, the entire disclosure of which is hereby incorporated by reference in its entirety.

BACKGROUND OF THE INVENTION

1. Field of the Invention

The present invention relates to sensor networks. More particularly, the present invention relates to a wireless sensor network and extending their life span, as well as a method for configuration of the wireless sensor network.

2. Description of the Related Art

A wireless sensor network (WSN) refers to a wireless network that includes sensor nodes having sensors for detecting and collecting specific information, and a sink node for transmitting collected information to an external network.

Unlike general networks, WSNs are used not for communication between people but are used for collecting information from autonomous devices at different locations. They are now used in various application areas, including science, medicine, military, commerce, etc.

Conventional WSN nodes have a small battery due to the size limitation of the network. The small size of the sensor node causes an energy limitation. The biggest problem is that the capacity of battery is too small for use in the sensor node. To resolve this problem, improvement of energy efficiency of the sensor network has been studied. There is a need in the art for a method to overcome the available energy limitation of the battery for a sensor network, and to extend the life span of the battery.

SUMMARY OF THE INVENTION

The present invention provides a wireless sensor network that can extend its own life span, and a method for configuration of the wireless sensor network.

In accordance with an exemplary embodiment of the present invention, the present invention provides a method for configuring a wireless sensor network that includes a plurality of sensor nodes and a sink node, the method can include: collecting location information about sensor nodes in the sink node; setting the sensor nodes to an active node, wherein said sensor nodes which have sensing regions include a transmitting region of the sink node, based on the location information; and configuring a network composed of the active nodes.

According to an exemplary aspect of the invention, setting the sensor nodes to an active node includes using a convex hull.

According to an exemplary aspect of the invention, setting the sensor nodes to an active node includes: setting the sensor nodes, located at the outermost location within the transmitting region of the sink node, to an existing reference node; selecting one of the sensor nodes, set to the reference node, as a new reference node, wherein the sensor node selected to be the new reference node is one of the sensor nodes located in an operation location with respect to the reference node and is selected so that sensor nodes, other than the sensor node selected to be the new reference node, are located on a straight line of a segment that connects the existing reference node and the sensor node selected to be the new reference node or located in the operation direction of the segment; repeating the selecting of one of the sensor nodes, set as the reference node, as a new reference node, using another new reference node until a polygon is completed by the segments; and setting all of the reference nodes to an active node.

According to an exemplary aspect of the invention, the location information is transmitted, via a beacon frame, from the sensor nodes to the sink node.

According to an exemplary aspect of the invention, the method further includes: sensing specific data through the configured network; setting, when a dead node occurs, one or more of the inactive nodes to an active node; and reconfiguring a network composed of the set active nodes.

According to an exemplary aspect of the invention, setting one or more of the inactive nodes to an active node comprises using a convex hull.

According to an exemplary aspect of the invention, one or more of the inactive nodes is set to an active node so that the one or more inactive nodes are included in the transmitting region of the sink node and have their sensing regions including in the transmitting region of the sink node.

In accordance with another exemplary embodiment of the present invention, the present invention provides a wireless sensor network that can include: a plurality of sensor nodes, each of which is operated as an active node, an inactive node, and a dead node; and a sink node for location information about the sensor nodes, setting part of sensor nodes, whose sensing region includes a transmitting region of the sink node, to an active node based on the collected location information, and controlling the set sensor nodes to be operated as an active node.

According to an exemplary aspect of the invention, the sink node sets the sensor nodes to an active node according to the convex hull principle.

According to an exemplary aspect of the invention, the sensor nodes are located within the transmitting region of the sink node.

According to an exemplary aspect of the invention, the sink node controls any of the inactive nodes to be operated as an active node, in which any of the inactive nodes, located within the transmitting region of the sensor nodes, are included in the transmitting region of the sink node when any of the active nodes is a dead node.

According to an exemplary aspect of the invention, the sensor nodes transmit the location information to the sink node via a beacon frame.

As described above, the present invention provides advantages in that, when a sensor node, serving as an active node, and whose sensing region includes a transmitting region of a sink node, performs a sensing operation, and a corresponding active node exhausts its life span, an inactive node can perform the sensing operation, thereby extending the life span of the network.

BRIEF DESCRIPTION OF THE DRAWINGS

The above and other exemplary aspects, features and advantages of certain exemplary embodiments of the present invention will become more apparent from the following description taken in conjunction with the accompanying drawing, in which.

DETAILED DESCRIPTION

Hereinafter, exemplary embodiments of the present invention are described in detail with reference to the accompanying drawings. Detailed descriptions of well-known functions and structures incorporated herein may be omitted when their inclusion might obscure appreciation of the subject matter of the present invention by a person of ordinary skill in the art.

First, the configuration of the wireless sensor network according to the present invention is described in detail below.

Figure 1:
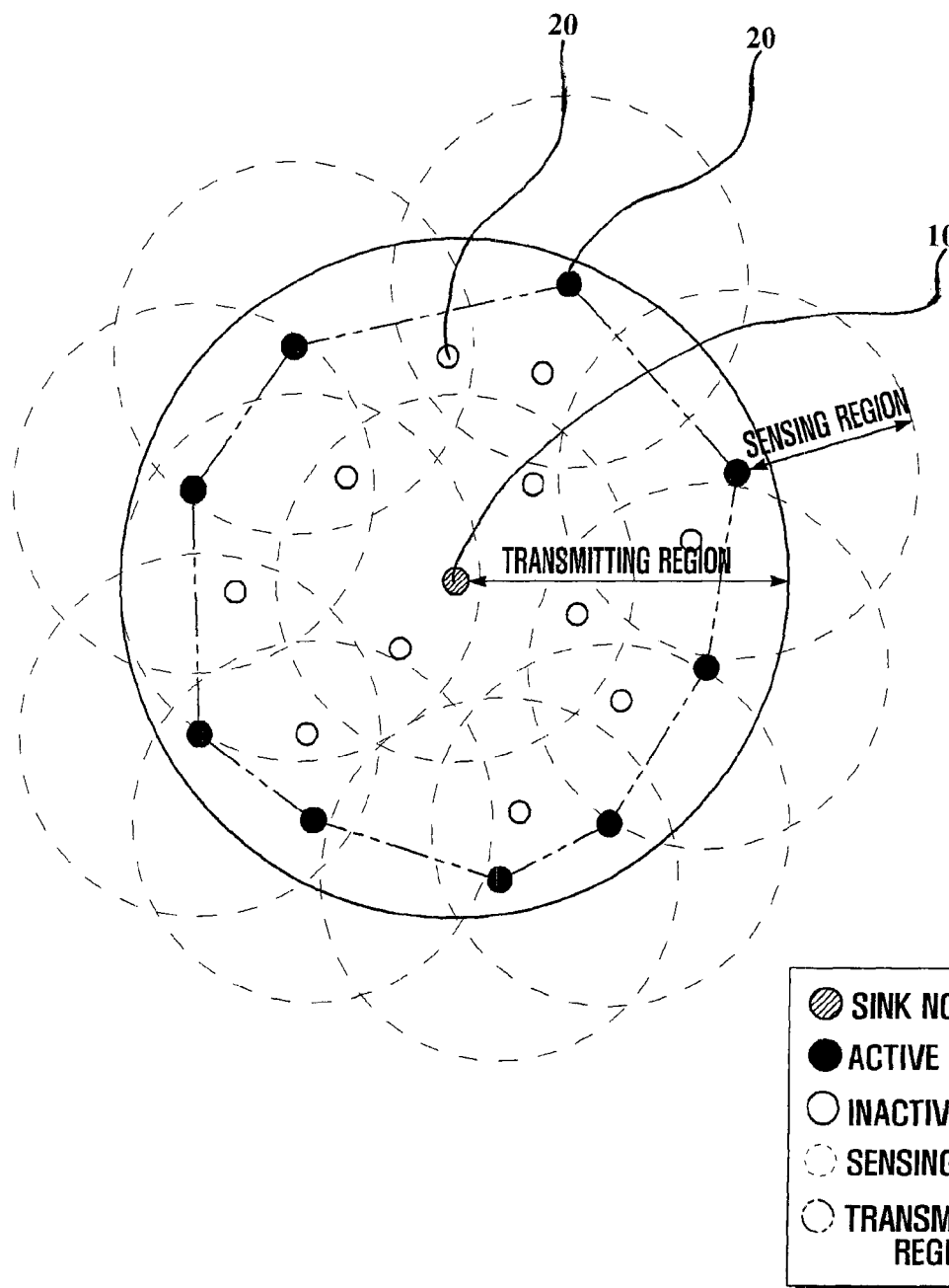
FIG. 1 is a view illustrating a wireless sensor network according to an exemplary embodiment of the present invention.

FIG. 1 is a view illustrating a wireless sensor network according to an exemplary embodiment of the present invention. Referring now to FIG. 1, a wireless sensor network, hereinafter referred to as a "sensor network," includes a plurality of nodes 20.

Each node 20 refers to an ultra-small, low power device whose size may be about, for example, 1 mm$^3$. The node includes a sensor for sensing specific data, an analog-to-digital converter (ADC) for converting sensed data into digital signals, a processor for processing data, a memory for storing the data, a battery for supplying power to elements in the node, and a wireless transceiver for transmitting and receiving data thereto/therefrom.

The nodes are deployed over corresponding certain regions, respectively, establishing a network therebetween, and then sense specific data of the corresponding regions to provide them to a user. Each node is classified as a sink node 10 or a sensor node 20, according to its function.

Sensor nodes detect physical or environmental changes in their installed regions, such as temperature, humidity, atmospheric temperature, etc., and transmit them to the sink node. Sensor nodes can be installed in predetermined locations. They may be installed in a certain area in such a way as to be arbitrarily distributed from a vehicle or an airplane, etc. They are, in general, fixed at a particular location. The sensor nodes may be, however, installed in or on mobile objects, such as a PDA, a laptop computer, a person, etc., so that they can operate while the mobile objects are moving.

In particular, the sensor nodes according to an exemplary embodiment of the present invention can be classified into three types: active, inactive, and dead.

An active node refers to a sensor node that performs a sensing operation while its power is turned on.

An inactive node refers to a sensor node that wakes up and transmits data, such as a beacon frame, etc., thereto, at a certain period, while its power has been turned off prior to wakeup. The inactive node does not perform a sensing operation.

A dead node refers to a node among the active nodes, which exhausts its battery energy so that it cannot perform any more sensing operations.

A sink node manages and controls sensor nodes in the sensor network and collects data sensed thereby. It transmits the collected data to a gateway, where the gateway refers to a device that can transmit the sensed data to an external network.

When the sensor nodes sense specific data of respective regions, respectively, the sink node collects the sensed data. The sensed data are transmitted to the external network via the sink node, and then provided to a user.

The respective nodes of the sensor network are small and accordingly their battery size is relatively smaller. Therefore, such nodes do not have a sufficient amount of available energy for full operation. The nodes also consume much more power than any other components. For example, a narrow-band wireless device outputting 0 dBm consumes 15 mA in a 3 V transmission (TX) mode and 5~15 mA in a reception (RX) mode. A distribution spectrum wireless device typically consumes more current in a reception mode than in a transmission mode. This current consumption is a burden on a sensor node that mainly uses a battery of less than approximately 220 mA per hour. Therefore, to save battery power, it is preferable to increase the turn off time of the wireless device.

However, in a multi-hop wireless sensor network, to enhance sensor connectivity and traffic transmission, the respective nodes must cooperate with each other. If the wireless device is turned off for a relatively long period of time, the nodes may miss packets or be dropped altogether. Furthermore, the nodes may perform numerous retransmitting operations or lose their connection.

Therefore, in an exemplary embodiment of the present invention, a network is configured that includes nodes within 1 hop of a sink node. That is, the network includes sensor nodes within a transmitting region of a sink node.

The respective nodes may be installed at predetermined locations. They may be installed in a certain area so as to be arbitrarily distributed from a vehicle or an airplane, etc. In both cases, the sensor nodes may be located such that their sensing regions are duplicated.

Therefore, in an exemplary embodiment of the present invention, only a portion of the sensor nodes 20 having the duplicated sensing regions are active and another portion of the sensor nodes are inactive. That is, when a part of the sensor nodes 20 becomes an active node, another part of the sensor nodes becomes an inactive node. The sensing regions of the active nodes include all transmission regions of the sink node.

Referring to FIG. 1, the sensor nodes may have duplicated sensing regions (indicated by a broken line).

Therefore, when a topology is designed for a sensor network, all the sensing regions of the active nodes may be included in the transmitting region of the sink node (an alternated long and short dash line). It is preferable to use the minimum number of active nodes required for operation.

When the sink node receives information about locations of sensor nodes, each sensor node is being operated as an active node or an inactive node according to the control of the sink node. To this end, each of the sensor nodes, including a sink node 10 and a sensor node 20, transmits a beacon frame thereto. The beacon frame structure is briefly described with reference to FIG. 2.

Figure 2:
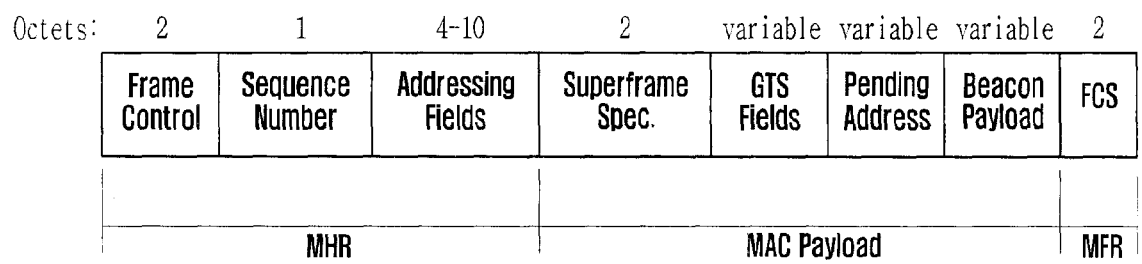
FIG. 2 is a view illustrating a beacon frame structure according to an exemplary embodiment of the present invention.

FIG. 2 shows an exemplary frame structure of a MAC layer. A beacon frame loads information onto a MAC payload and then transmits this information. The MAC payload is defined by a MAC header (MHR) and followed by a MAC footer (MFR). That is, a beacon frame includes a MAC header, a MAC payload following the MAC header, and a MAC footer following the MAC payload.

The MAC header preferably includes a frame control, a beacon sequence number (BSN) and an addressing field. It may further include an auxiliary security header.

The MAC payload includes a superframe specification, a guaranteed time slot (GTS) field, a pending address field and a beacon payload.

The MAC footer includes a frame check sequence (FCS) of preferably 16 bits.

Respective nodes exchange information with each other by the transmission and reception of a beacon frame. Each node includes its location information in the beacon payload of a beacon frame and then transmits it to other nodes. Therefore, the sink node can detect information about respective sensor nodes through the beacon payload. The sink node includes a control signal, used for determining whether or not a node is an active node or an inactive node in the beacon payload, and then transmits the payload to the respective nodes.

The MAC footer includes a frame check sequence (FCS) of, for example, 16 bits.

Figure 3:
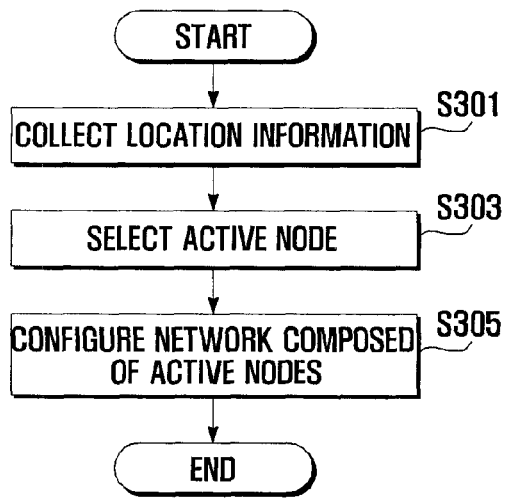
FIG. 3 is a flow chart describing a method for configuring a topology of a wireless sensor network according to an exemplary embodiment of the present invention.

A method for configuring a sensor network, according to an exemplary embodiment of the present invention, will now be explained in detail below. FIG. 3 is a flow chart describing an exemplary operation for configuring a topology of a wireless sensor network according to an embodiment of the present invention.

Referring now to FIG. 3, the sink node 10 collects information about locations of respective sensor nodes 20 (S301). It may collect the location information through the beacon frames transmitted by the sensor nodes 20.

After that, the sink node 10 select Node State for all sensing regions of each node (S303). That is, it determines whether to set the respective sensor nodes 20 to be in an active state or an inactive state, using the location information received through the beacon frames.

As described above, all sensing regions of the sensor nodes 20, that are intended to be in an active state, are set to be included within the transmitting region of the sink node 10. It is preferable to use the minimum number of sensor nodes 20 required for operation.

In an exemplary embodiment of the present invention, a method for determining an active node uses a convex hull, which will be explained in detail later.

Still referring to FIG. 3, the sink node 10 configures a network formed by the selected active nodes (S305). That is, it changes the selected sensor nodes into an active node and the unselected sensor nodes into an inactive node.

To configure the network in (S305), the sink node transmits the beacon frames, including active information and inactive information about the respective sensor nodes, to the respective sensor nodes. It is preferable that the beacon frames are transmitted by a broadcasting method. When the respective sensor nodes receive the beacon frames having active information and inactive information, they are changed into an active node or an inactive node according to the corresponding information they received from the sink node.

FIG. 1 shows a topology of the sensor network configured according to the above description. As shown in FIG. 1, the nodes in an active state are in the transmitting region of the sink node and have sensing regions that includes the transmitting region. Therefore, the nodes can save energy.

Figure 4:
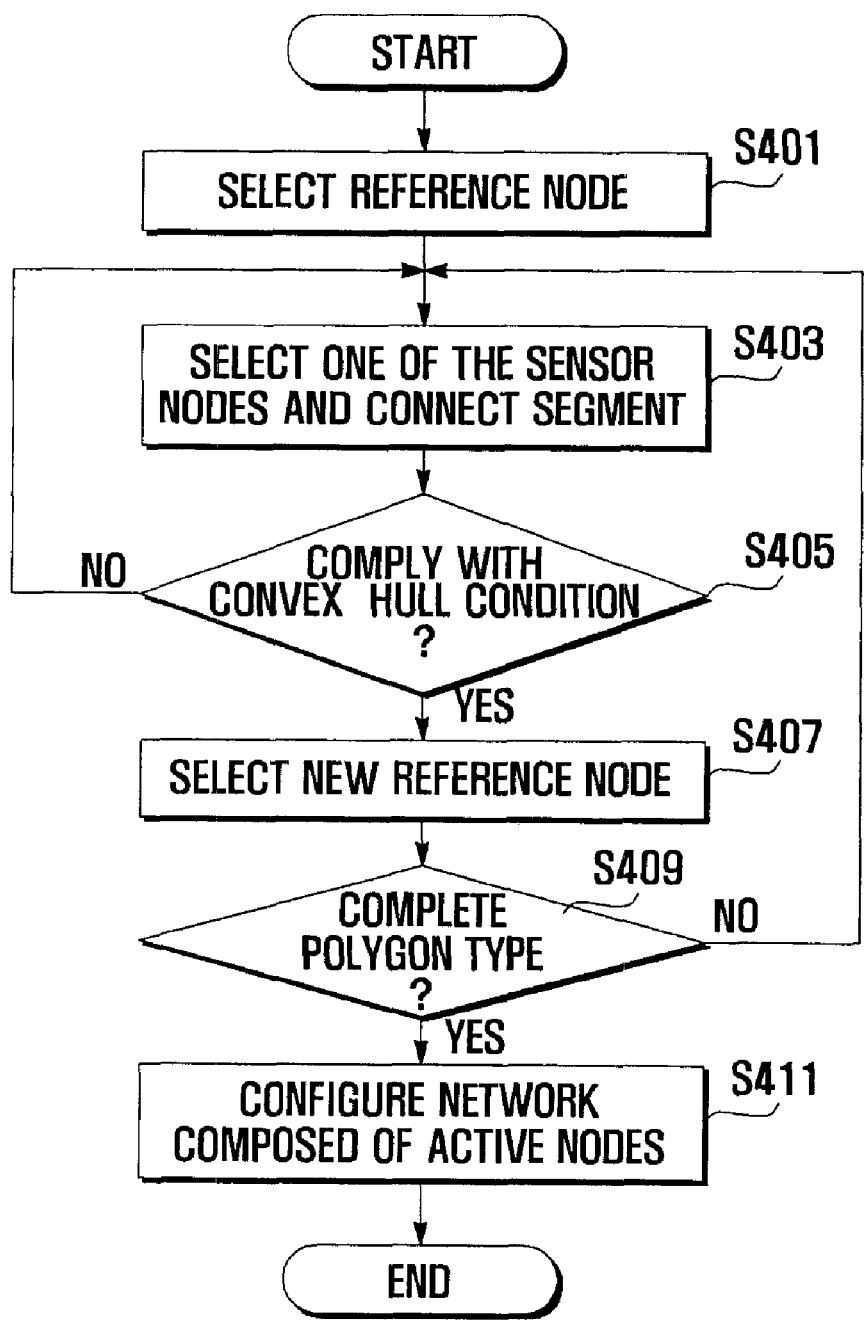
FIG. 4 is a flow chart describing a method for selecting an active node using a convex hull, according to an exemplary embodiment of the present invention.
Figure 5:
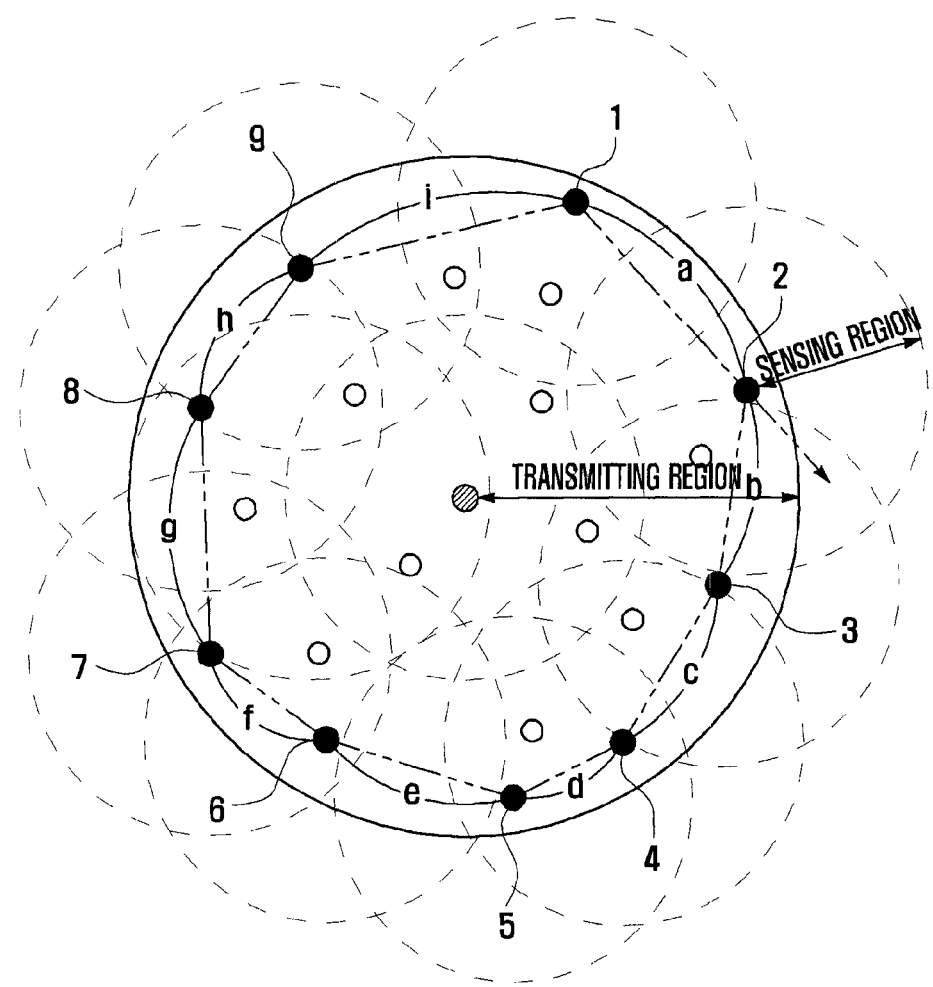
FIG. 5 is a view describing a method for selecting an active node using a convex hull, according to an exemplary embodiment of the present invention.
Figure 5:
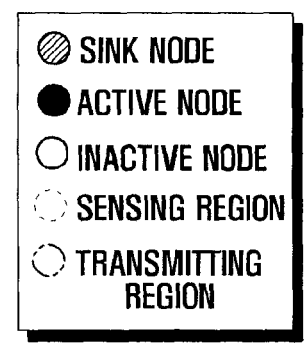

At step S303, the sink node 10 determines an active node using a convex hull, which is an exemplary aspect of the present invention. Selecting an active node using the convex hull is explained in detail below with reference drawings. FIG. 4 is a flow chart describing a method for selecting an active node using a convex hull, according to an exemplary embodiment of the present invention. FIG. 5 is a view describing a method for selecting an active node using a convex hull, according to an exemplary embodiment of the present invention.

The convex nature of the planar area means that all points on the segment connecting between two points belonging to the area also belong to a corresponding area. Searching for a convex hull in a set of points is defined as searching for a polygon including the segment itself, which connects the points. As shown in FIG. 5, $1^{st}$ to $9^{th}$ sensor nodes correspond to the points of the convex hull. Segments "a~i" are referred to as a convex hull line. A convex hull refers to a polygon composed of the convex hull lines.

It should be noted that the sensor network is configured by only sensor nodes that are within the transmitting region of the sink node 10. That is, the sensor network is configured by only sensor nodes within a 1 hop region of the sink node 10.

Furthermore, in this example, it is assumed that the sink node 10 receives information about locations of the sensor nodes through S301. The operation for setting an active node requires a process in either the clockwise or counterclockwise direction, which is called an "operation direction" in the present application. An exemplary embodiment of the present invention is executed as described herein below, assuming that the operation direction is set to the clockwise direction.

Referring to FIG. 4 and FIG. 5, a sensor node is selected as the reference node such that the sensor node is located the farthest position from the sink node 10, within the transmitting region of the sink node 10, (S401). That is, the $1^{st}$ node 1 is selected as the reference node.

Next, one of the sensor nodes located in the operation direction (or the clockwise direction) is selected and then connected to the reference node to form a segment (S403). In this particular example of the present invention, the $2^{nd}$ node 2 is selected and segment "a" is formed.

After that, the sink node 10 determines whether the segment complies with the convex hull condition (S405). That is, the sink node determines whether sensor nodes other than the one sensor node) are located on a straight line of the segment, or whether there are c-sensor nodes (other than the one sensor node) located in the operation (or the clockwise direction) when the segment is rotated to the operation direction with respect to the reference node. For example, the sink node 10 determines whether other sensor nodes except for the $2^{nd}$ sensor node 2 are located on the straight line of segment "a" or whether the other sensor nodes are located in the operation direction when they are rotated in the clockwise direction with respect to the $1^{st}$ sensor node.

When the sink node 10 ascertains that the segment complies with the convex hull condition at S405, it selects the one sensor node as a new reference node (S407). For example, if segment "a" is formed by the reference node ($1^{st}$ sensor node 1) and $2^{nd}$ sensor node 2, other sensor nodes are located on the straight line of the segment "a" or in the clockwise direction. Therefore, the $2^{nd}$ sensor node 2 is selected as a new reference node. On the contrary, when the sink node 10 ascertains that the segment does not comply with the convex hull condition at S405, it repeats step S403 until the segment complies with the convex hull condition.

Still referring to FIG. 4, the sink node 10 connects the reference nodes 1 and 2, selected at steps S401 and S407, and then determines whether or not to form a polygon (S409).

When the sink node 10 ascertains that the polygon is not formed at S409, it performs steps S403, S405 and S407 using the reference node selected at S407.

For example, with reference to FIGS. 4 and 5, as the $2^{nd}$ sensor node is selected with respect to the $1^{st}$ sensor node 1, a $3^{rd}$ sensor node 3 can be searched with respect to the $2^{nd}$ sensor node 2. When these steps S403, S405 and S407 are repeated, the $1^{st}$ to $9^{th}$ 1~9 sensor nodes can be selected. When all the segments a~i, used for searching for the sensor nodes 1~9, are connected in order, a polygon is formed. The process for selecting sensor nodes to be set as an active node continues on until a polygon is formed.

On the contrary, when the sink node 10 ascertains that the polygon is formed at S409, it sets all the reference nodes, selected through the previous steps, to an active node (S411).

In summary, with respect to the sensor node as a reference node located at the outermost location within the transmitting region of the sink node, all sensor nodes except for the reference node are searched that may be located to the right (or the clockwise direction) or on the straight line. When sensor nodes are searched again in order, with respect to the newly searched sensor node as a reference node, to comply with the same condition, the minimum number of sensor nodes can be sought to cover all the sensor nodes within the network.

As described above, an active node is selected and then a topology is configured for a sensor network composed of the active nodes. When the topology is configured, the active nodes sense data and transmit the sensed data to the sink node.

The nodes, including active nodes and a sink node, transmit and receive data thereto and therefrom using request-to-send/clear-to-send (RTS/CTS) control packets.

To reduce power consumption of a node in a sensor network, transmission, reception and processing times are generally minimized. However, when the duty cycle operation is low, the network response is also delayed resulting in possible network congestion or network instability. The present invention includes arrangement of the node duty cycle to enhance system level performance. The result is that the power efficiency is increased, and the network robustness and the network responsibility are enhanced.

Many factors affect the power consumption of wireless communication devices. In order to save battery power and to prevent packet loss and failed connections, the network nodes must cooperatively turn on and off wireless communication devices. To this end, several design problems must be resolved in a MAC layer of a protocol stack, a network layer, and an application layer.

A general method for saving power is to turn off a wireless device to reduce a reception time, based on the MAC layer protocol design for a wireless sensor network. For example, if the $4^{th}$ sensor node 4 recognizes that the $2^{nd}$ sensor node 2 transmits packets to the sink node 10, the $4^{th}$ sensor node 4 turns off its power to save energy while it receives packets unrelated to its own operation. The turn off time of a node must be varied according to the expected transmission time of a packet. This general method is proper for the MAC protocol that uses request-to-send/clear-to-send (RTS/CTS) control packets.

One or more nodes of the active nodes, which transmit sensed data thereto through the described above method, may be a dead node due to the battery power consumption. The sink node changes one or more of the sensor nodes from an inactive state into an active node. The reason for the change by the sink node is to reconfigure a sensor network whose sensor regions include the entire transmitting region of the sink node. The reconfiguration of the sensor network continues until no active sensor remains in the transmitting region of the sink node.

Figure 6:
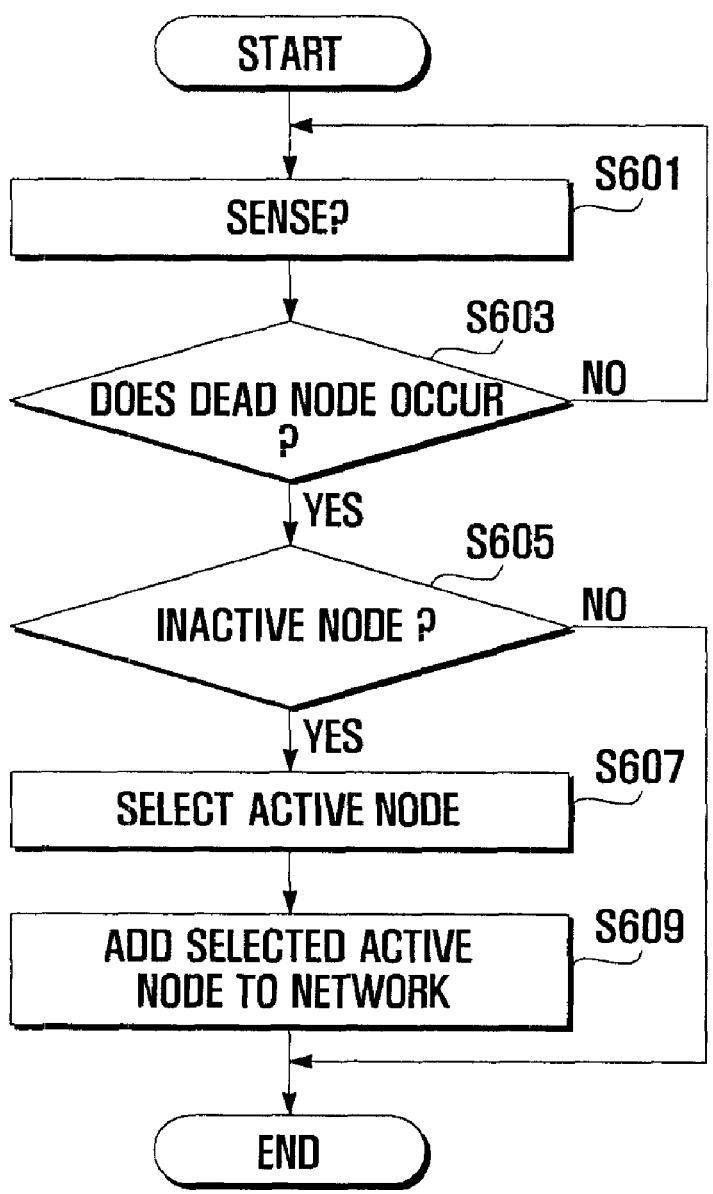
FIG. 6 is a flow chart describing a method for reconfiguring a wireless sensor network when a dead node is generated, according to an exemplary embodiment of the present invention.

FIG. 6 is a flow chart describing a method for reconfiguring a wireless sensor network when a dead node is generated, according to an exemplary embodiment of the present invention. Referring now to FIG. 6, the sink node 10 performs a sensing operation where it receives sensed data from the active nodes (S601).

During the sensing operation, any of the active nodes may be a dead node due to exhausted battery power. In such a case, the sink node 10 detects this situation (S603), and determines whether an inactive node exists (S605).

There are two methods for detecting a dead node. All the sensor nodes periodically transmit beacon frames to the sink node 10. Therefore, if the sink node 10 does not receive a beacon frame from the node for a certain period of time, the sink node regards the sensor node that has not sent a beacon frame to be a dead node. If the remaining battery power of a sensor node is less than a critical value that is previously set, the sensor node can transmit notification information to the sink node that the sensor node will be soon a dead node.

When the sink node 10 ascertains that there are no inactive nodes at S605, the sink node 10 terminates the network reconfiguration. In that case, the sink node 10 continues to perform a sensing operation until the existing active nodes exhaust their life spans.

On the contrary, when at (S 605) the sink node 10 ascertains that an inactive exists, the sink node 10 selects an active node (S607). As described above, an active node is selected such that all the sensing regions of a sensor node, intended to be a new active state, can be included in the transmitting region of the sink node. It is preferable to use the minimum number of the sensor nodes intended to be active. The active nodes can be calculated by a method using a convex hull, for example.

Still referring to FIG. 6, the sink node 10 adds the selected active nodes to the network to reconfigure the network. Network reconfiguration may be performed via message exchange with the sensor nodes.

Figure 7:
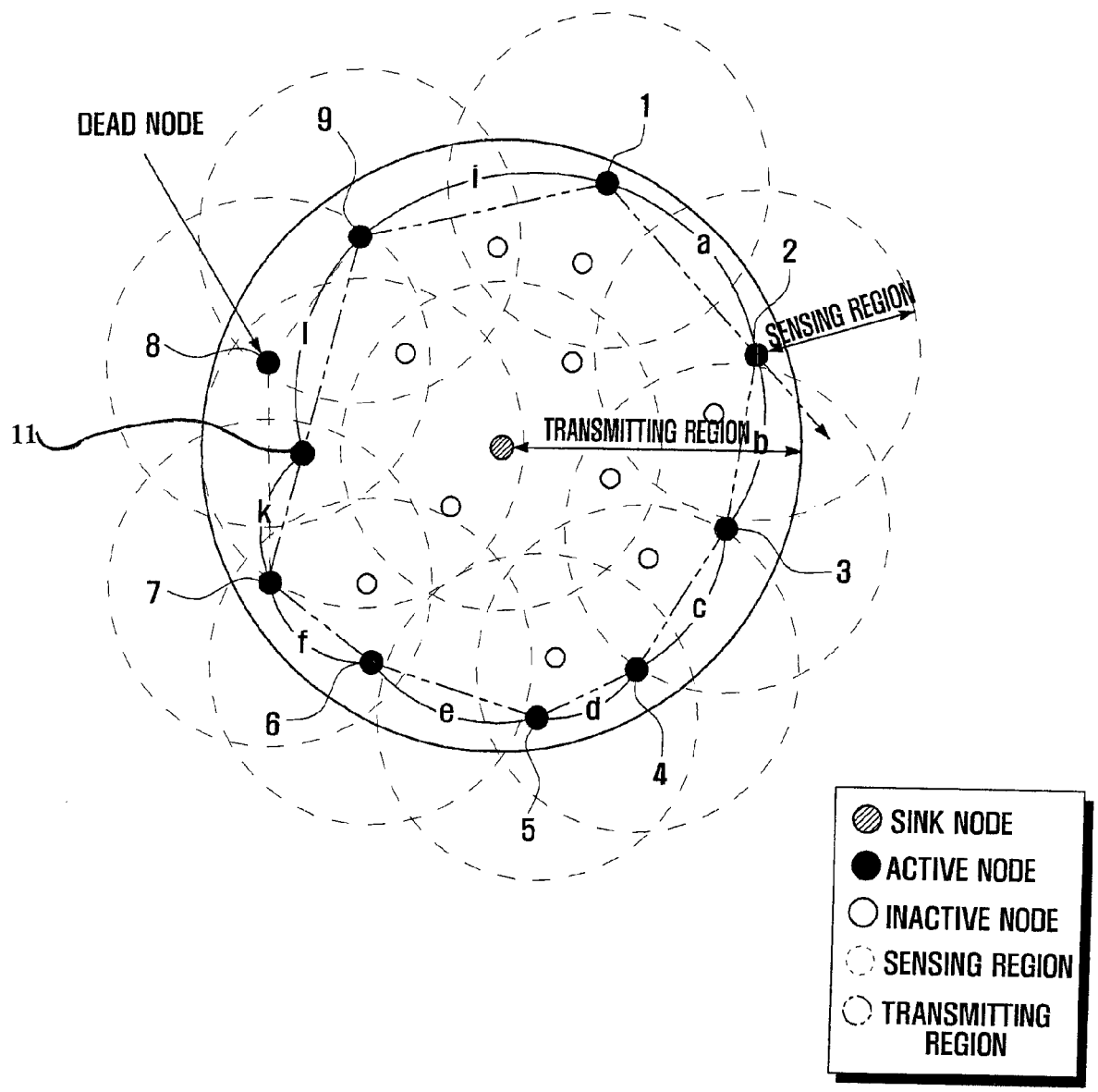
FIG. 7 is a view describing a method for selecting an active node using a convex hull when a network is reconfigured, according to an exemplary embodiment of the present invention.

In the following description, a method for selecting an active node using a convex hull when a network is reconfigured is explained in detail below. FIG. 7 is a view describing a method for selecting an active node using a convex hull when a network is reconfigured, according to an exemplary embodiment of the present invention. Selecting an active node using a convex hull is explained using the same explanation when previously explained with reference to FIG. 4 and FIG. 5.

In FIG. 7, it is assumed that the $8^{th}$ sensor node 8 is a dead node. In that case, one of the sensor nodes, located in the operation direction (or the clockwise direction) of the $7^{th}$ sensor node 7, is selected and then the selected sensor node is connected to the $7^{th}$ sensor node by a segment "k". Here, the segment is selected such that other sensors, except for a sensor node to be selected, are on the straight line of the segment or located at in the operation direction (or the clockwise direction) of the segment. In other words, when the $11^{th}$ sensor node 11 is connected to the $7^{th}$ sensor node by segment "k", other inactive nodes are on the straight line of the segment "k" or located in the clockwise direction of the segment "k".

Still referring to FIGS. 6 and 7, of the segments that connect the $11^{th}$ sensor node 11 to other sensor nodes, segment "l" is unique as other nodes are located on the straight line thereof and in the clockwise direction thereof. Therefore, the 9th sensor node 9 is selected as an active node. As a result, a polygon is completed and thus the process for selecting active nodes is terminated.

Figure 8:
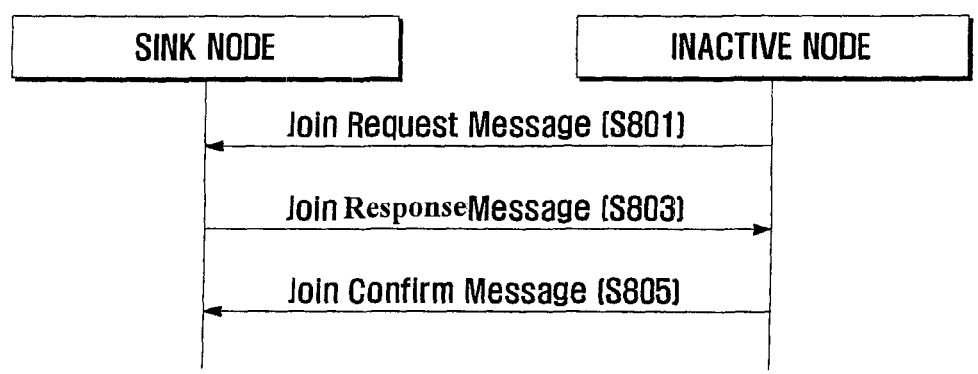
FIG. 8 is a signal flow chart describing a method for activating an inactive node, according to an exemplary embodiment of the present invention.

When an active node is selected using a convex hull, the sink node must activate the selected sensor node, which is explained in detail below. FIG. 8 is a signal flow chart describing a method for activating an inactive node, according to an exemplary embodiment of the present invention.

Referring now to FIG. 8, the inactive nodes wake up periodically and transmit a Join Request Message to the sink node (S801).

The sink node determines whether the inactive node having transmitted the request message is set to an active node. When the sink node ascertains that the inactive node is set to an active node, it transmits a Join Response Message to the sensor node (S803).

When the inactive node receives the Join Response Message, it is changed into an active node and then transmits a Join Confirm Message to the sink node (S805).

Although the invention has been shown and described with respect to exemplary embodiments thereof, it should be understood that these embodiments are only illustrative and not intended to limit the scope of the invention. Therefore, one skilled in the art will understand that the exemplary embodiments disclosed in the description and configurations illustrated in the drawings are only preferred embodiments, and there are be various modifications, alterations, and equivalents thereof, which do not depart from the scope and spirit of the invention as described in the appended claims.

What is claimed is:

1. A method for configuring a wireless sensor network that includes a plurality of sensor nodes and a sink node, comprising:
   (a) collecting location information about a plurality sensor nodes within a region of a sink node;
   (b) setting the sensor nodes, which have sensing regions including at least a portion of a transmitting region of the sink node, to an active node state one or more of the plurality of inactive nodes is set to an active node based on the location information; and
   (c) configuring a network including the active nodes from (b);
   wherein setting the sensor nodes to an active node in (b) comprises:
   (i) setting the sensor nodes, located at the outermost location within the transmitting region of the sink node, to an existing reference node;
   (ii) selecting one of the sensor nodes, set to the existing reference node in (i), as a new reference node, wherein the sensor node selected to be the new reference node is one of the sensor nodes located in an operation location with respect to the existing reference node and is selected so that sensor nodes, other than the sensor node selected to be the new reference node, are located on a straight line of a segment that connects the reference node and the sensor node selected to be the new reference node or located in the operation direction of the segment;
   (iii) repeating the selecting of one of the sensor nodes, set as the existing reference node, as another new reference node, using the another new reference node until a polygon is completed by the segments; and
   (iv) setting all of the reference nodes to an active node state.

2. The method of claim 1, wherein setting the sensor nodes to an active node state in (b) comprises using a convex hull to search for a polygon in a set of points including a segment which connects the points.

3. The method of claim 1, wherein the location information is transmitted, via a beacon frame, from the sensor nodes to the sink node.

4. The method of claim 1, further comprising:
   (d) sensing specific data through the network configured in (c);
   (e) setting, when a dead node occurs, one or more of a plurality of inactive nodes to an active node state; and
   (f) reconfiguring a network composed of the set of active nodes.

5. The method of claim 4, wherein setting one or more of the plurality of inactive nodes to an active node state comprises using a convex hull.

6. The method of claim 4, wherein one or more of the plurality of inactive nodes is set to an active node state is included in a transmitting region of the sink node.

7. The method of claim 6, wherein one or more of the plurality of inactive nodes set to an active node state have sensing regions included in the transmitting region of the sink node.

8. A wireless sensor network comprising:
   a plurality of sensor nodes, each of which operates in one of an active node, an inactive node, and a dead node state; and
   a sink node for obtaining location information about the plurality of sensor nodes, setting one or more of the plurality of sensor nodes, whose sensing region includes a transmitting region of the sink node, to an active node state based on the collected location information, and controlling the set sensor nodes for operation in an active node state;
   wherein the sink node sets one or more of the sensor nodes located at an outermost location within the transmitting region of the sink node, to an existing reference node, selects one of the sensor nodes set to the existing reference node, as a new reference node, and wherein the sensor node selected to be the new reference node is one of the sensor nodes located in an operation location with respect to the existing reference node and is selected such that the sensor nodes, in the operation location other than the sensor node selected to be the new reference node, are located on a straight line of a segment that connects the existing reference node and the sensor node selected to be the new reference node or located in the operational direction of the segment.

9. The network of claim 8, wherein the sink node sets the sensor nodes to an active node state according to the convex hull principle.

10. The network of claim 8, wherein the sensor nodes are located within the transmitting region of the sink node.

11. The network of claim 8, wherein the sink node controls the inactive nodes to be operated as an active node, in which any of the inactive nodes, located within the transmitting region of the sensor nodes, are included in the transmitting region of the sink node when any of the active nodes becomes a dead node.

12. The network of claim 11, wherein the sink node reconfigures the set of active nodes.

13. The network of claim 8, wherein the sensor nodes transmit the location information to the sink node via a beacon frame.

14. The network according to claim 8, wherein dead nodes are detected by the sink node, and inactive nodes are activated by the sink node to reconfigure the network as needed in response to the detected dead nodes.

* * * * *